United States Patent [19]

Pfaff

[11] Patent Number: 4,693,869

[45] Date of Patent: Sep. 15, 1987

[54] ELECTRODE ARRANGEMENT FOR CREATING CORONA

[76] Inventor: Ernest H. Pfaff, 1549 Woodvale Ave., Deerfield, Ill. 60015

[21] Appl. No.: 841,847

[22] Filed: Mar. 20, 1986

[51] Int. Cl.[4] ........................ B01J 19/08; B01J 19/12; H01J 1/88; H01J 19/42

[52] U.S. Cl. ................................ 422/186.04; 118/72; 118/621; 313/243; 422/186; 422/186.05; 422/907

[58] Field of Search .............. 422/186, 186.03, 186.04, 422/186.05, 186.06, 187.07, 186.08, 186.21, 186.23, 906, 907; 118/72, 621, 625; 313/243-244, 292; 204/164, 165

[56] References Cited

U.S. PATENT DOCUMENTS

| | | | |
|---|---|---|---|
| 2,132,708 | 10/1938 | Smith | 422/907 |
| 3,397,136 | 8/1968 | Balogh | 422/186.05 |
| 3,405,052 | 10/1968 | Schirmer | 204/312 |
| 3,419,489 | 12/1968 | Delaney, Jr. | 422/186.05 |
| 3,600,122 | 8/1971 | Coleman | 422/186.05 |
| 3,779,882 | 12/1973 | Rosenthal | 204/165 |
| 4,051,044 | 9/1977 | Sorensen | 422/186.05 |
| 4,059,497 | 11/1977 | Kolbe et al. | 204/165 |
| 4,298,440 | 11/1981 | Hood | 204/165 |
| 4,533,523 | 8/1985 | Ahlbrandt | 422/186.05 |

FOREIGN PATENT DOCUMENTS

| | | | |
|---|---|---|---|
| 3322341 | 1/1985 | Fed. Rep. of Germany | 422/907 |

*Primary Examiner*—John F. Terapane
*Assistant Examiner*—Howard J. Locker
*Attorney, Agent, or Firm*—Lee, Smith & Zickert

[57] ABSTRACT

An electrode arrangement for creation of a corona. The arrangement includes a corona driving portion and a corona emitting portion in electrical contact with the corona driving portion. The corona driving portion is much larger in size than the corona emitting portion such that corona from the electrode arrangement is emitted essentially from the corona emitting element in a direction away from the corona driving element. In the illustrated embodiments of the invention, the corona driving element comprises a rod with a chain-like corona emitting element suspended adjacent to the rod. In another embodiment of the invention, the corona driving element comprises a flat disc and the corona emitting element comprises a tapered ring at the outer circumference of the disc.

19 Claims, 9 Drawing Figures

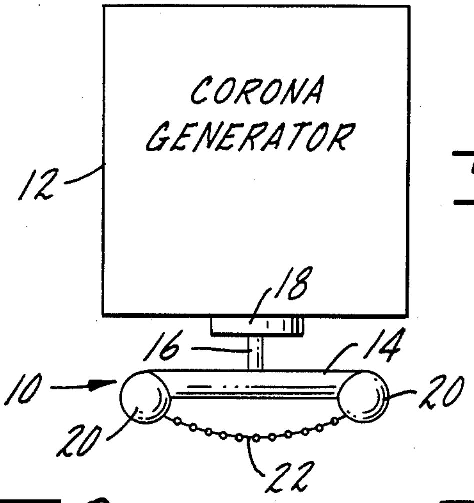
Fig. 1.
Fig. 2.
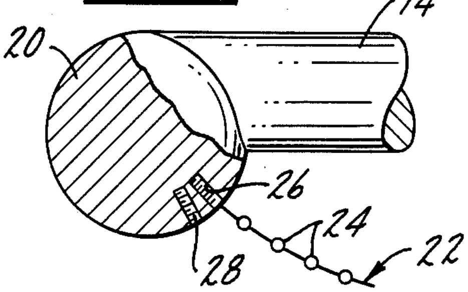
Fig. 3.
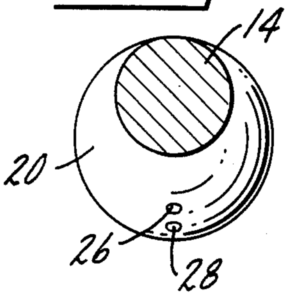
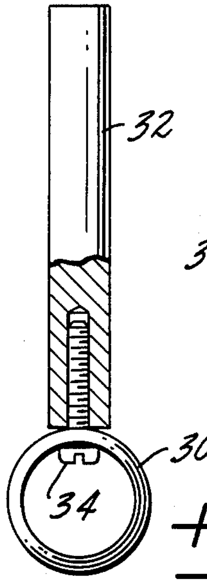
Fig. 4.
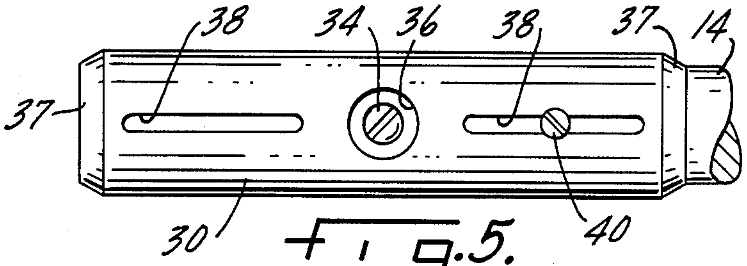
Fig. 5.

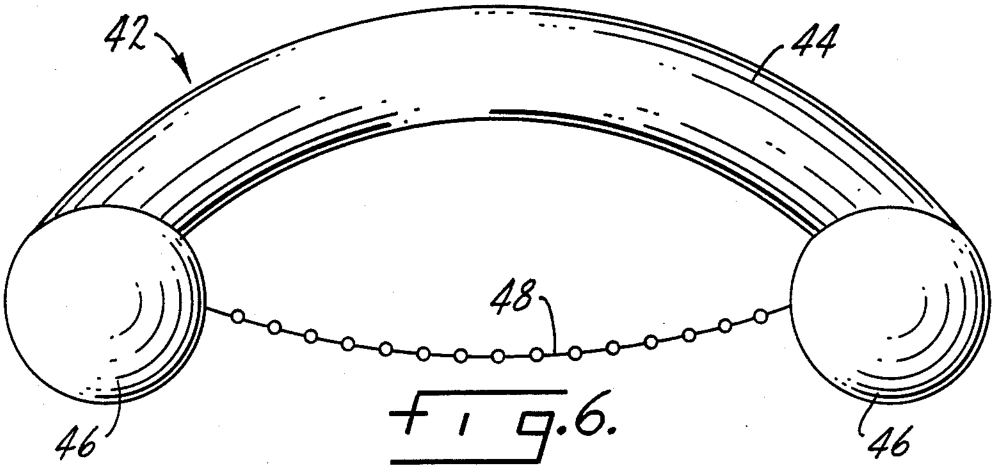
Fig. 6.
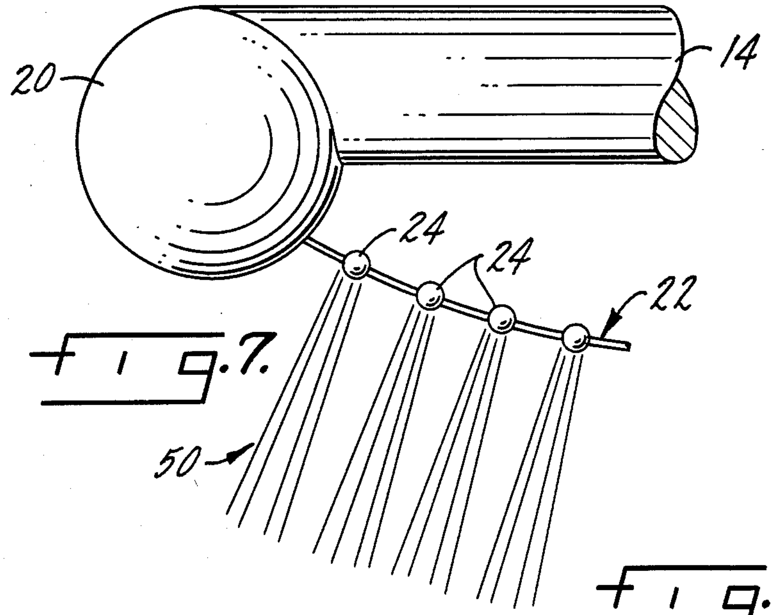
Fig. 7.
Fig. 8.
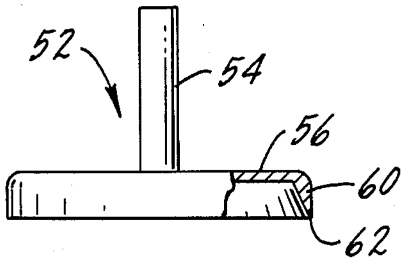
Fig. 9.
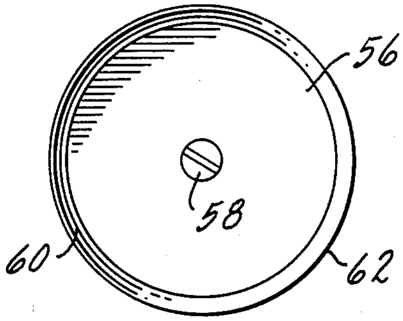

ELECTRODE ARRANGEMENT FOR CREATING CORONA

BACKGROUND OF THE INVENTION

This invention pertains to creation of electrical coronas, and in particular to an electrode arrangement for creation of a corona for surface treating of plastics and other materials.

Many plastics, when molded, will not accept an adhesive, a coating, or various inks or printing vehicles without alteration of the surface to which such materials are applied. Accordingly, surfaces are roughened or are treated with a corona in order to increase the surface wetting capability of the plastic material, and therefore its ability to accept such materials.

In the past, when plastic materials were to be treated with a corona, the corona was created by applying electricity of a sufficiently high voltage and frequency to a wire, and the plastic item was passed directly beneath the wire over an appropriate ground plane which tends to draw the corona emitted from the wire toward to the plastic object being passed beneath the wire. However, the wire naturally emits a corona irregularly, in all directions, and therefore the corona being emitted from the wire many times cannot extend a sufficient distance from the wire to treat the depths of grooves, holes and other irregularities formed in the plastic material which is desired to be treated. Because the corona is emitted in all directions, a good portion of the corona is wasted, never coming into contact with the plastic material which is to be treated.

SUMMARY OF THE INVENTION

The present invention provides a unique electrode arrangement for creation of a corona. The electrode arrangement is configured to be attached to an appropriate electrical corona generator and is made of an electrically conductive material, such as metal. The electrode arrangement includes a stem for attachment to the corona generator, a corona driving element secured to the stem, and a corona emitting element in electrical contact with the corona driving element. The corona driving element is greater in size than the corona emitting element such that the corona emitted from the electrode arrangement is emitted essentially from the corona emitting element in a direction away from the corona driving element.

In accordance with one embodiment of the invention, the corona driving element comprises a rod and the corona emitting element comprises a plurality of linked, irregular segments, preferably a series of balls connected in a chain-like fashion. An enlarged sphere is formed at each end of the rod, with the corona emitting element being secured between the spheres. Preferably, an outer surface of the rod is tangent to the sphere, and each sphere includes a plurality of locations for attachment of the corona emitting element.

The rod can be curved or straight. Where varying lengths of the rod are desired, the rod can comprise a pair of rod segments with a sleeve being provided for interconnecting of the rod segments. The sleeve is slotted, and each rod segment is secured to the sleeve by means of a screw passing through an associated slot segment and engaging the rod segment.

In accordance with a second embodiment of the invention, the corona driving element comprises a disc and the corona emitting element comprises a ring circumferentially secured to the disc. The ring tapers to a corona emitting edge distant from the disc. Preferably, the disc and the ring are integral in order to preclude creation of a corona from any juncture of the disc and the ring.

BRIEF DESCRIPTION OF THE DRAWINGS

The invention is described in greater detail in the following description of examples embodying the best mode of the invention, taken in conjunction with the drawings, in which:

FIG. 1 is a schematic illustration of one form of the invention in conjunction with a corona generator, FIG. 2 is an enlarged view of a portion of the form of the invention shown in FIG. 1, partially in cross section to illustrate an internal connection, FIG. 3 is a view looking from the right of FIG. 2, with the corona emitting chain omitted for clarity, FIG. 4 is an end elevational view, partially in cross section, illustrating a sleeve according to the invention for adjustment of the length of the electrode of FIG. 1, FIG. 5 is a bottom view of the sleeve shown in FIG. 4, with a portion of one of the electrode rods being illustrated, FIG. 6 is a plan view of an alternative embodiment of the electrode of FIG. 1, with the stem for attachment to the corona generator being omitted, FIG. 7 is an enlarged view of one end of the electrode of FIG. 1, similar to FIG. 2, showing the corona discharge from the corona emitting element, FIG. 8 is an elevational illustration of a second embodiment of the invention, partially in cross section to show the internal structure, and FIG. 9 is a bottom plan view of the electrode shown in FIG. 8.

DESCRIPTION OF EXAMPLES EMBODYING THE BEST MODE OF THE INVENTION

Illustrated in FIG. 1 is an electrode 10 according to the invention when installed within a corona generator 12. The corona generator 12 can be any readily available high voltage, high frequency corona generator, such as the BD-80 surface treater manufacured by Electro-Technic Products Company, Chicago, Ill. The BD-80 surface treater will optimally operate at 250 kv at a frequency of 2 MHz. Other suitable corona generators can be used, and the invention is not limited to any particular type of corona generator nor any specific value of voltage or frequency generated by the corona generator.

As shown in FIGS. 1 through 3, the electrode 10 is composed of a rod-like corona driving element 14 which is attached to the corona generator 12 by means of an integral stem 16 secured within a chuck 18 of the corona generator 12. An enlarged sphere 20 is located at each end of the driving element 14, and preferably is an integral extension thereof with no roughness or irregularity at the junction between each sphere 20 and the driving element 14, in order to avoid generation of a spurious corona at that location.

A corona emitting element 22 extends between the two spheres 20. As best shown in FIG. 2, the corona emitting element 22 is composed of a plurality of linked irregular segments, as a series of balls 24 connected in a chain-like fashion as illustrated, for generation of the corona. Each end of the emitting element 22 is inserted within a bore 26 or 28 in the sphere 20, depending on the desired orientation of the emitting element 22 relative to the driving element 14, and the ends of the corona emitting element may be held in place in any suitable manner. The bore 26 is shown at approximately 45° inclination relative to the corona driving element 14, while the bore 28 is shown at approximately 60° inclination relative to the driving element 14. Other bores can be located as desired for proper orientation of the emitting element 22.

At times, it is desired to adjust the length of the rod-like corona driving element 14. To accomodate length variations, the driving element 14 can be composed of a pair of rod segments which are secured within a sleeve 30, the sleeve 30 being shown in FIGS. 4 and 5.

The sleeve 30 is attached to a stem 32 (identical to the stem 16) by means of a screw 34. As shown in FIG. 5, the screw 34 is accessed within the sleeve 30 through an aperture 36.

The sleeve 30 includes a taper 37 at each end to effect a smooth transition between the sleeve and the segments of the corona driving element 14. The sleeve 30 also includes a pair of slots 38. The slots 38 extend through the wall of the sleeve 30 and permit passage of a screw 40 extending into an appropriate aperture in an associated segment of the driving element 14. By judicious adjustment of the segments of the driving element 14 within the sleeve 30 and tightening of the screws 34, the length of the driving element 14 can therefore be varied. Because the aperture 36, slots 38 and screws 40 are located on the bottom of the sleeve 30, toward the corona emitting element 22 (not illustrated in FIGS. 4 or 5), the irregularities of these elements will not create a spurious corona.

FIG. 6 illustrates a variation of the first embodiment of the invention, showing an electrode 42 which is identical to the electrode 10 except that, as illustrated, the electrode 42 has a curved corona driving element 44. Identical to the electrode 10, the electrode 42 includes spheres 46 at opposite ends of the corona driving element 44, and a corona emitting element 48 composed of a series of linked balls and extending between the spheres 46.

It has been found by the applicant that, optimally, the separation between the corona emitting element (22 or 48), and the corona driving element (14 or 44) must be at least ½ inch when used in combination with the BD-80 corona generator described above. If the separation is less, generation of the corona is generally squelched.

FIG. 7 illustrates schematically generation of a corona. The electrode arrangement shown is that of the electrode 10 of FIGS. 1 through 3, and is not described in any greater detail. As shown in FIG. 7, the corona 50 is emitted from each ball 24 of the corona emitting element 22, and is emitted in a direction away from the corona driving element 14. The corona driving element 14 tends to drive the corona 50 downwardly and no ground plane or the like is required to obtain a fairly deep corona 50 from the corona emitting element 22. In practice, the applicant has generated a corona 50 of over 2 inches in length, considerably longer than the corona generated by a conventional electrode wire, that corona being on the order of ½ inch or less. Thus, the corona 50, with its exceptional length, can be used to treat deep bores and grooves heretofore unreachable with conventional surface treating apparatus.

The spheres 46 are used to eliminate generation of any corona at the ends of the driving elements 14 or 44.

Were the spheres eliminated, corona would be generated. The size of the spheres 20 or 46 prevents the escape of corona from their rounded surfaces, due to the relatively small size of the corona emitting element 22 or 48. Also, as shown, the spheres 20 or 46 are connected to their respective driving elements 14 or 44 such that the driving elements are tangent to the top surfaces of the spheres 20 and 46. This permits a sufficient depth of the sphere extending beneath the driving element to permit attachment of the corona emitting element. Larger spheres can be employed, if desired, but no increase in efficiency is attained.

A second embodiment of the invention is shown in FIGS. 8 and 9. In this embodiment of the invention, an electrode 52 is composed of a stem 54 attached to a disc-like corona driving element 56. As shown in FIG. 9, a bolt 58 passing through the corona driving element 56 is used to secure the stem 54 thereto.

In this embodiment of the invention, the corona emitting element 60 is in the form of an integral ring at the outer circumference of the driving element 56. As best shown in FIG. 8, the emitting element 60 is tapered to a tip or edge 62 from which the corona is emitted.

Although not illustrated, the corona being emitted from the edge 62 is emitted downwardly in a direction away from the corona driving element 56, in a ring like fashion due to the annular nature of the emitting element 60. Also, because the corona consists of ionized gas, the corona extends outwardly from the edge 62 and not toward the center of the area beneath the electrode 52.

Various changes can be made to the invention without departing from the spirit thereof or scope of the following claims.

What is claimed is:

1. An electrode arrangement for creation of a corona, the electrode arrangement being configured for attachment to a high frequency electrical corona generator generating frequencies on the order of 2 MHz and being made of an electrically conductive material, the electrode arrangement comprising:

a. a stem for attachment to the corona generator, b. a corona driving element secured to said stem, and c. a corona emitting element in electrical contact with said corona driving element, d. said corona driving element being greater in size than said corona emitting element such that corona from the electrode arrangement is emitted essentially from said corona emitting element in a direction away from said corona driving element.

2. An electrode arrangment accoding to claim 1 in which said corona driving element comprises a rod and said corona emitting element comprises a plurality of linked irregular segments.

3. An electrode arrangement according to claim 2 in which said linked irregular segments comprise a series of balls connected in a chain-like fashion.

4. An electrode arrangement according to claim 2 including an enlarged sphere at each end of said rod, said corona emitting element being secured to said spheres.

5. An electrode arrangement according to claim 4 in which said rod includes an outer surface which is tangent to said sphere.

6. An electrode arrangement according to claim 4 in which each said sphere includes a plurality of locations for attachment of said corona emitting element.

7. An electrode arrangement according to claim 2 in which said rod is straight.

8. An electrode arrangement according to claim 2 in which said rod is curved.

9. an electrode arrangement according to claim 1 in which said corona driving element comprises a pair of rod segments and means interconnecting said segments.

10. An electrode arrangement according to claim 9 in which said interconnecting means comprises a sleeve adapted to closely accomodate said segments.

11. An electrode arrangement according to claim 10 in which said driving element is adjustable in length, said sleeve including an adjustment slot therein.

12. An electrode arrangement according to claim 11 in which said slot includes a pair of slot segments, each segment being located proximate one end of said sleeve, and including means for securing each rod segment to said sleeve.

13. An electrode arrangement according to claim 12 in which said means to secure comprises a screw passing through each slot segment and engaging a rod segment.

14. An electrode arrangement according to claim 10 in which each end of said sleeve includes a taper.

15. An electrode arrangement according to claim 1 in which said corona driving element comprises a disc and said corona emitting element comprises a ring circumferentially secured to said disc.

16. An electrode arrangement according to claim 15 in which said ring includes a taper to a corona emitting edge.

17. An electrode arrangement according to claim 15 in which said disc and said ring are integral.

18. An electrode arrangement for creation of a corona, the electrode arrangement being configured for attachment to a high frequency electrical corona generator generating frequencies on the order of 2 MHz and being made of an electrically conductive material, the electrode arrangement comprising:

a. a stem for attachment to the corona generator, b. a corona driving element secured to the stem and comprising an elongated rod, c. an enlarged sphere at each end of said rod, and d. a corona emitting element connected to and between said spheres, said corona emitting element being composed of a plurality of irregular segments, e. said rod being greater in size than said corona emitting element such that corona from the electrode arrangement is emitted essentially from said corona emitting element in a direction away from said rod.

19. An electrode arrangement according to claim 18 in which said segments comprise a series of balls linked in a chain-like fashion.

* * * * *